United States Patent

Soda et al.

[11] 3,993,721
[45] Nov. 23, 1976

[54] METHOD OF FORMING A FOAMED ARTICLE HAVING A SIMULATED WOOD GRAINED SURFACE

[75] Inventors: Shigenari Soda, Nagaokakyo; Motoshige Hayashi, Ikoma; Shigetoshi Tanaka, Nara, all of Japan

[73] Assignee: Sekisui Kaseihin Kogyo Kabushiki Kaisha, Nara, Japan

[22] Filed: Mar. 10, 1975

[21] Appl. No.: 557,024

[30] Foreign Application Priority Data
Mar. 9, 1974   Japan................................ 49-27354

[52] U.S. Cl............................. 264/45.5; 264/45.9; 264/46.5; 264/46.6; 264/176 R; 264/DIG. 14
[51] Int. Cl.² ...................... B29D 7/02; B29D 27/00; B29F 3/08
[58] Field of Search........ 264/45.6, 45.9, 46.1–46.3, 264/48, 51, 453, DIG. 66, 171, 209, 321, 210, 176 R, 280, 45.5, 46.5, 46.6, DIG. 14; 156/244; 425/461, 464

[56] References Cited
UNITED STATES PATENTS

| 3,720,572 | 3/1973 | Soda et al. ........................... 264/321 |
| 3,764,642 | 10/1973 | Boutillier .......................... 264/46.1 |
| 3,857,914 | 12/1974 | Ashima et al. ..................... 264/46.1 |

Primary Examiner—Willard E. Hoag
Attorney, Agent, or Firm—Armstrong, Nikaido & Wegner

[57] ABSTRACT

An improved process for preparing foamed articles of thermoplastic resin having a hard, mar-resistant surface that is flat and smooth and resembles natural wood, and an extrusion die therefor. In the process a softened thermoplastic is extruded through apertures of the extrusion die of the invention which is a fiered die having a resin discharge plate having a peripheral recessing portion and a protruding interior portion which are formed on the resin discharge plate by one or more step-ups. Each of the peripheral and interior portions of the resin discharge plate is provided with a plurality of apertures, the aperture density of the peripheral portion being greater than that of the interior portion. A longitudinally extending cooling frame is mounted adjacent the resin discharge plate and extends in the direction of extrusion to at least the forward face of the interior portion of the plate. The cooling frame together with the interior portion of the resin discharge plate form a restrictive contact zone into which foamable resin members from the recessing portion are extruded. These members are thereafter coalesced with resin members extruded from the interior portion of the plate.

The process is particularly suitable for preparing simulated wood articles.

8 Claims, 15 Drawing Figures

METHOD OF FORMING A FOAMED ARTICLE HAVING A SIMULATED WOOD GRAINED SURFACE

BACKGROUND OF THE INVENTION

This invention relates to an improved process for preparing a foamed article and to a die therefor. The primary object of the present invention is to obtain a foamed article having a flat and smooth surface which is difficult to mar.

It is known that a foamed article can be obtained by extruding a foamable thermoplastic resin. It is also known that a foamed article can be prepared by a process which comprises using a die having a resin discharge plate provided with a number of apertures, extruding a foamable resin from the apertures to form a plurality of resin strands or members, and coalescing the resin strands into a foamed article. Further, it has also been known that the quantity of the individual resin strands can be controlled as desired, when use is made of the die having said apertures, by varying the dimensions of the apertures, the distances between contiguous apertures, or the land lengths of the apertures. For example, U.S. Pat. No. 3,720,572 discloses that a foamed article can be obtained having resin strands of desired densities in the desired positions thereof, by employing a die which is provided with a number of apertures appropriately varied in dimensions and distributions, foamable resin strands are extruded from the apertures and coalesced into a unitary article. The patent also discloses that the foamed article thus obtained has on the surface a pattern resembling straight grains in the natural wood.

According to the disclosure in U.S. Pat. No. 3,720,572, a foamed article is to be obtained in which the resin strands in the surface portion are foamed to low foaming degrees and the surface is hard to mar, since in general, the process disclosed therein can give a desired density to each of the resin strands, regardless of their position in the article. Additionally, especially when polystyrene is used as a raw material, it is easy to form in the surface of each of the resin strands a layer which is foamed to a low foaming degree and has a high density. In practice, however, it is not always possible to achieve a surface layer foamed to the desired low foaming degree and high density, and the article is liable to be marred when used in certain fields of application. Furthermore, articles produced according to the known process may occasionally rupture along the coalescing surfaces between the strands, owing to imperfect coalescence of the strands.

The present invention aims to improve such defects. The inventors attempted to develop a process for preparing a foamed article, the surface of which is hard to mar and which has coalescing lines which appear as if they are straight grains in natural wood, by extruding a foamable resin into a number of resin strands and by coalescing the resin strands into a unitary article immediately after they have been extruded.

The inventors tried initially to cool some resin strands alone which were positioned in the outer-most layer in the foamed article, in order to allow the resin strands to expand to lower foaming degrees. In general, cooling has heretofore been practiced when foamable resin strands are extruded and coalesced, but the cooling has only been carried out by either blasting the air from a position far away from the resin, in order to avoid direct contact of the resin strands with the cooling means, or by allowing the resin strands to contact the cooling means for only a short distance, for example, point contact at a line extending in the direction perpendicular to the direction of extrusion. Contact over a short distance was used because direct contact of the resin strands with the cooling means tends to prevent mutual coalescence of the resin strands. The inventors, however, tried to cool the foamable resin strands by allowing the members to contact the cooling means directly over a longer distance. For this purpose, the inventors mounted a cooling frame on a die, and advanced the resin strands in contact with the cooling frame over a distance of more than several mm immediately after the resin strands had been extruded from the die. Only the resin strands which were positioned in the outer-most layer were cooled by this means. As a result, it was found that the resin strands in the surface portion of the foamed article were foamed to comparatively low foaming degrees. Coalescing lines between the resin strands, however, were formed in considerably sunken states on the surface of the article, and thus the article did not have a flat, smooth and beautiful surface.

The inventors made further studies, therefore, to a develop a process which would eliminate these surface defects and, as a result, have found that it is effective to form a step-up on the resin discharge face of the die, such that an inner portion of the face projects from an outer portion of the face when viewed from the front of the resin discharge plate, and, accordingly, to extrude the foamable resin from the apertures in the outer portion at an earlier stage than the resin from the apertures in the inner portion. The inventions have also found that, in order to cause the outer resin strands along to be of high densities in this case, it is desirable to increase the diameters of the outer apertures relative to those of the inner apertures, or to distribute the apertures more densely in the outer portion than in the inner portion. The present invention is based on the above findings.

SUMMARY OF THE INVENTION

According to the present invention an improvement in a process for preparing a foamed article of thermoplastic resin is provided. In the process wherein a melt of foamable thermoplastic resin is extruded through a die having a resin discharge plate which is provided with a plurality of apertures to form upon extrusion a plurality of resin members which are thereafter passed through a cooling zone and coalesced to form the foamed article, the improvement comprises extruding said foamble thermoplastic resin through a tiered resin discharge plate having a peripheral resin discharge portion and an interior resin discharge portion such that apertures in said interior discharge face extend beyond apertures in said peripheral discharge face in the direction of extrusion to form first extruded outer resin members and second extruded inner resin members; the aperture density in said peripheral resin discharge face being greater than the aperture density in said interior resin discharge face. The extrudate is immediately passed through a longitudinally extended cooling frame positioned in peripheral contact with the peripheral resin discharge portion in such a manner as to restrict the further expansion of the extrudate, whereby the outer extruded resin members are extruded firstly through the peripheral resin discharge portion into restrictive contact with the cooling frame and are thereafter coalesced with the inner resin members being discharged through said inner resin discharge portion.

Conventional features of the process described in U.S. Pat. No. 3,720,572, are incorporated herein by reference.

According to another aspect of the present invention, a die is provided which is used in preparing the foamed article of thermoplastic resin.

THe primary features of the present invention relate to the use of (1) a specific die, characterized in that a resin discharge plate in the die is provided with a number of apertures and includes at least one step-up or tier formed on the resin discharge face so that the apertures in the inner portion of the die are protruded beyond the apertures in the outer, peripheral, portion; the aperture density in the outer recessed portion being greater than that of the inner protruding portion, which portions are divided by the step-up; and (2) a cooling frame mounted to the resin discharge face of the plate.

BRIEF DESCRIPTION OF THE DRAWINGS

The process and the die of the invention are illustrated in the accompanying drawings, in which, FIG. 1 shows an example of a forward portion of a die of the invention, wherein a step-up, or tier, is formed on a resin discharge plate. In particular, FIG. 1b is a sectional view of the forward portion taken along line b—b in FIG. 1a.

FIG. 2 shows a forward portion of another embodiment of a die of the invention wherein two step-ups are formed in tiers on a resin discharge plate of the die. FIG. 2b is a sectional view of the forward portion taken along line b—b in FIG. 2a.

FIG. 8 shows a forward portion of a die of the invention, which is used for preparing a lintel for sliding doors. In particular, FIG. 8a is a front view of the forward portion of the die and FIG. 8b is a sectional view of the forward portion of the die taken along line b—b in FIG. 8a.

FIG. 9 shows a forward portion of yet another die according to the invention. In particular; FIG. 9b is a sectional view of the forward portion of the die taken along line b—b in FIG. 9a.

DETAILED DESCRIPTION

As used herein the term step-up denotes an extension of the resin discharge face of a resin discharge die in the direction of extrusion of the foamable thermoplastic resin. The step-up serves to divide the resin discharge face into two or more portions so as to form a tiered or tier-like structure. In its simplest form the step-up divides the resin discharge face into two parallel faces, a peripheral, or outer, resin discharge face, and an interior, or inner, resin discharge face. The interior resin discharge face protrudes beyond the peripheral resin discharge face in the direction of extrusion. Since each of these faces are provided with a plurality of apertures through which a softened foamable thermoplastic resin is extruded and in view of the longitudinally extending cooling frame that is provided around the outer periphery of the peripheral resin discharge face according to the invention, it can be seen that as the softened thermoplastic resin is extruded, resin members, or strands, are first extruded through the apertures of the peripheral resin discharge face into the zone formed between the inner walls of the cooling frame and the side walls of the interior resin discharge face, i.e., the extension of the resin discharge face of the die. These first extruded resin members upon extrusion from the apertures of the peripheral resin discharge face begin to foam and come into restrictive contact with the inner walls of the cooling frame and the extension of the resin discharge face. Resin members which are thereafter extruded from the apertures of the protruding interior resin discharge face expand and coalesce with the first extruded resin members and with each other and are formed into the desired foamed article. It is to be noted that the terminology interior resin discharge face is used generally herein to refer to any configuration of an extension of the resin discharge face which provides an outer, or peripheral, resin discharge face having a plurality of apertures that is recessed relative to apertures in the extension of the resin discharge plate. Finally, the outer resin discharge face is referred to as a peripheral resin discharge face since for most applications it is desired to produce a foamed article having a mar-resistant surface on all sides thereof. It is possible, however, that for particular applications, one or more surfaces may not be required to have the very high resistance to marring provided by the present invention and that a peripheral resin discharge face, therefore, will not have to extend completely around the periphery of the resin discharge face. The peripheral resin discharge face includes, of course, these possibilities. The various modifications and embodiments of the present invention may be better understood by referring to the drawings in conjunction with the following detailed description.

Figure 1A:
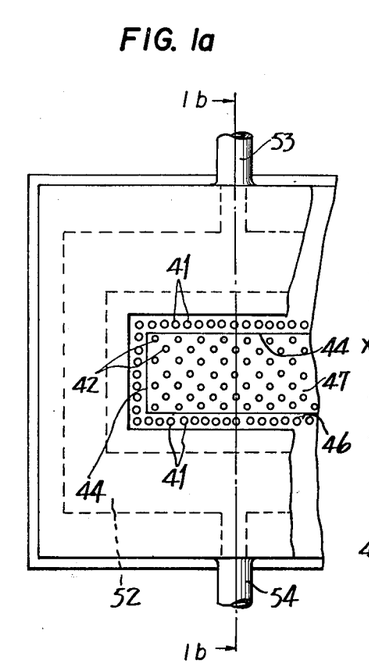
FIG. 1a is a front view of the die partly cut away.
Figure 1B:
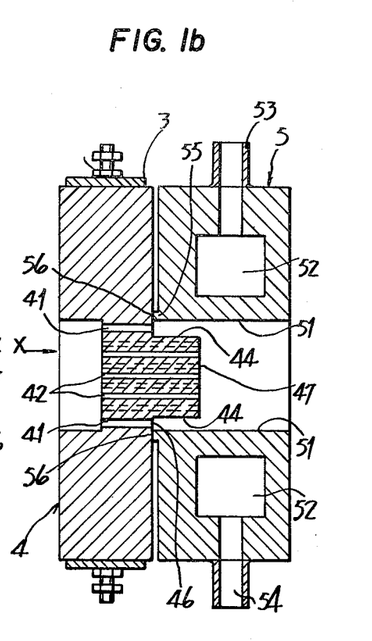

Referring now to FIG. 1, a resin discharge plate of die of the invention is illustrated. In FIG. 1, the resin is advanced in the direction indicated by arrow X, a step-up 44 is formed on a resin discharge plate of a die 4, dividing the resin discharge face into two portions, protruding, or interior portion 47 and recessing, or peripheral, portion 46. Apertures 42 are perforated in protruding portion 47, and apertures 41 in recessing portion 46. Apertures 41 have bigger diameters and are distributed in a closer relationship to each other than are apertures 42. Thus, the aperture density of apertures 41 in recessing portion 46 is greater than that of apertures 42 in protruding portion 47. Die 4 is surrounded by heater 3 in order to heat the die.

Cooling frame 5 is mounted on the resin discharge plate of die 4 in such a manner that frame 5 encloses apertures 41 and 42. Inner wall 51 of frame 5 extends in the direction almost identical with the resin advancing direction. Inner wall 51 is positioned on a line connecting the outer-most points in respective apertures 41, or at a distance of less than 3 mm from said line in the outward direction, and at any rate is positioned in close relationship to the line. Frame 5 has passage 52 which extends through the inner portion thereof and is connected with pipes 53 and 54. Frame 5 has a small protruding portion 55, the protruding face of which is contacted with resin discharge plate 4, but the remaining face of frame 5 is not contacted with resin discharge plate 4. A gap of about 2 mm is formed on the remaining face between frame 5 and resin discharge plate 4. Air exists in the gap and militates against heat conduction between die 4 and frame 5. Therefore, even if a cooling medium is circulated in passage 52 through pipes 53 and 54 during operation, frame 5 is not heated by die 4 and can maintain inner wall 51 at a lower temperature. In order to minimize heat conduction between die 4 and frame 5, it is sufficient to provide a gap of 1 mm to several mm width between the portions other than the contacting portions which extend over a small area or several points, but a heat insulating material such as fluoro-resin or mica may be interposed in the gap. Preferably inner wall 51 of frame 5 extends in a direction substantially parallel to the advancing direction of the resin members extruded from said apertures, however, inner wall 51 of frame 5 may be inclined so that frame 5 is progressively enlarged or reduced to some extent in the advancing direction.

The aperture density can be defined with reference to the frame in the following manner. Assume that $a$ represents the sum of cross-sectional area of apertures 41 in recessing portion 46, and that $A$ represents the area of recessing portion 46 which is defined by inner wall 51 of the frame and step-up 44, then the aperture density p of apertures 41 in recessing portion 46 can be represented by the following formula:

$$p = (a/A) \times 100$$

Likewise, assume that $b$ represents the sum of cross-sectional areas of apertures 42 in protruding portion 47, and that $B$ represents the area of protruding portion 47 defined by step-up 44, then the aperture density q of aperture 42 in prodruding portion 47 can be represented by the following formula:

$$q = (b/B) \times 100$$

In the die as shown in FIG. 1, it is necessary that the aperture density $p$ be greater than the aperture density $q$, that is $p > q$.

In general, the die employed according to this invention has a resin discharge plate in which a number of apertures are provided as illustrated in FIG. 1, in such a fashion that the apertures are distributed within an area corresponding to the cross-section of a desired product. Furthermore, the die is employed in combination with a frame which is mounted in the vicinity of the forward face of the resin discharge plate, and which surrounds the apertures. The resin discharge plate has on its forward face a step-up, which forms a protruding interior portion and a recessing peripheral portion, the protruding portion being positioned in the inner part of the plate and the recessing portion in the outer part of the plate, when viewed from the front of the die. Each of the portions must include a number of the apertures, and the aperture density in the recessing portion should be greater than that in the protruding portion. Preferably the aperture density in the recessing portion is 1.5 to 5 times the aperture density in the protruding portion.

As for the relationship between the frame and the protruding portion, it is desirable that the forward face of the frame be protruded in the forward, i.e., direction of extrusion, more than the forward face of the protruding portion of the die. Additionally, the frame should not shut or block any of the apertures. The inner wall of the frame may be located just on a line tangential to the outer-most apertures in the recessing portion, or the inner wall of the frame may be located within about 3 mm from said line in the outward direction.

The length of the step-up as measured along the axis of extrusion is normally 5 to 50 mm, and preferably 5 to 20 mm. Diameters of the apertures are normally 1 millimeter to several centimeters, preferably 1 to several millimeters. Distances between two adjacent apertures are 1 millimeter to several centimeters. The apertures in the recessing portion are preferably arranged in 1 to 3 lines.

FIG. 1 shows a typical die of the invention, but modified dies are included within the scope of the invention. Various examples of the dies are explained hereinbelow.

Figure 2A:
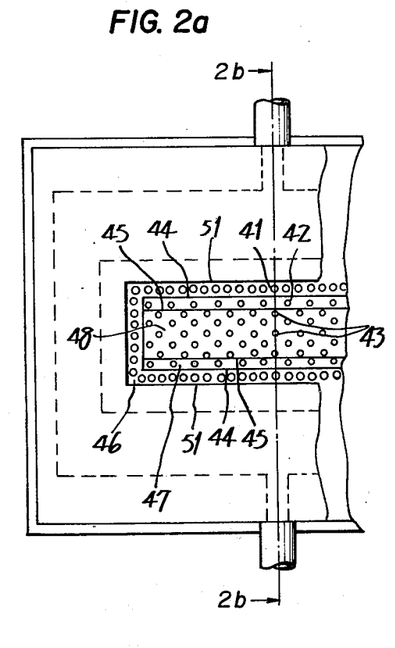
FIG. 2a is a front view of the forward portion, partly cut away.
Figure 2B:
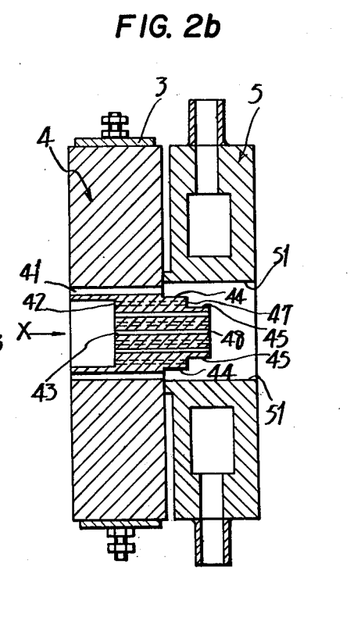

The resin discharge plate in FIG. 2 has two step-up 44 and 45 on the resin discharge face, which is divided into recessing portion 46, first protruding portion 47, and second protruding portion 48. The forward face of frame 5 protrudes beyond the forward face of second protruding portion 48. Apertures 41 are perforated in recessing portion 26, apertures 42 in first protruding portion 47, and apertures 43 in second protruding portion 48. On the resin inlet side, the portion of the die 4 corresponding to the face of recessing portion 46 around apertures 41 protrudes in the backward direction, i.e., the direction opposite to the direction of extrusion, and the rear face around apertures 42 makes an identical plane together with the rear face around apertures 43, both faces constituting a recessing surface on the resin inlet side.

All apertures 41 have identical dimensions. All apertures 42 have identical dimensions and all apertures 43 have identical dimensions. Of these apertures, apertures 41 are of the largest dimensions and are distributed in close proximity to each other. Apertures 42 have dimensions identical with those of apertures 43.

When the aperture densities of the respective portions are compared, aperture density $p$ of apertures 41 in recessing portion 46 is the greatest, and aperture density $q$ of apertures 42 in first protruding portion 47 is nearly identical to aperture density $r$ of apertures 43 in second protruding portion 48.

Incidentally, the die in FIG. 2, like the die in FIG. 1, is provided with frame 5 and heater 3.

Figure 3:
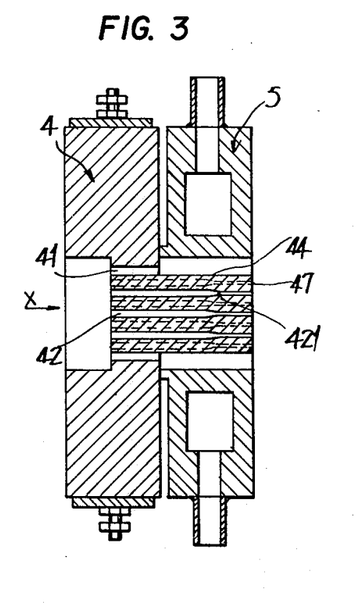
FIG. 3 is a sectional view of a forward portion of still another embodiment of a die of the invention, in which a step-up is formed on the resin discharge face and apertures are narrowed in the zone near to the forward end thereof.

The resin discharge plate in FIG. 3 is similar to that in FIG. 1, except that step-up 44 is extended in length and the forward face of protruding portion 47 is positioned on about the same plane as the forward face of frame 5. Apertures 42 in protruding portion 47 are reduced in their diameters in the vicinity of the forward face to form diameter-reduced portions 421. The resin discharge plate in FIG. 3, however, is similar to that in FIG. 1 in that the aperture density of apertures 41 in recessing portion 46 is greater than the aperture density of apertures 42, and accordingly than that of diameter-reduced portion 421, in protruding portion 47, and in that frame 5 is mounted on the resin discharge plate.

Figure 4:
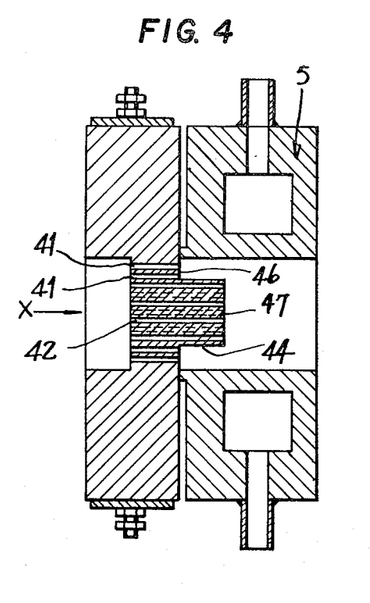
FIg. 4 is a sectional view of a forward portion of still another embodiment of a die, in which a step-up is formed on the resin discharge face, and apertures are perforated in two lines in the outer portion formed by the step-up on the resin discharge face.

The resin discharge plate in FIG. 4 is similar to that in FIG. 2, except that apertures 41 are perforated in two successive lines in recessing portion 46. That is, the resin discharge plate in FIG. 4 is similar to that in FIG. 1, in that a step-up is formed by means of which recessing portion 46 is distinguished from protruding portion 47, and in that the aperture density of apertures 41 in recessing portion 46 is greater than the aperture density of apertures 42 in protruding portion 47, and also in that frame 5 surrounding apertures 41 is mounted on the resin discharge plate.

Figure 5:
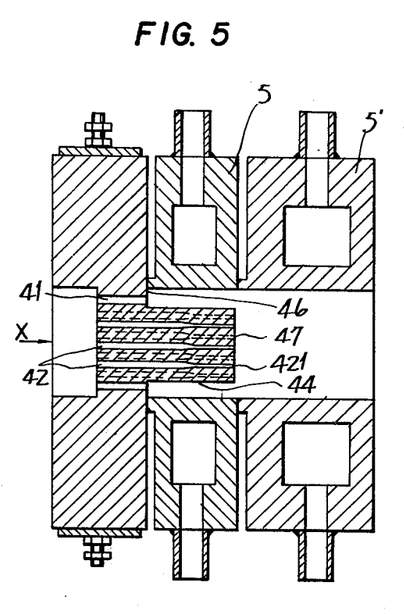
FIG. 5 is a sectional view of a forward portion of still another embodiment of a die of the invention which is similar to the die in FIG. 3, but is different in that two cooling frames are mounted in mutually adjacent relationship.

The resin discharge plate in FIG. 5 is similar to that in FIG. 3. However, an additional frame 5' is mounted on the forward face of frame 5.

Figure 6:
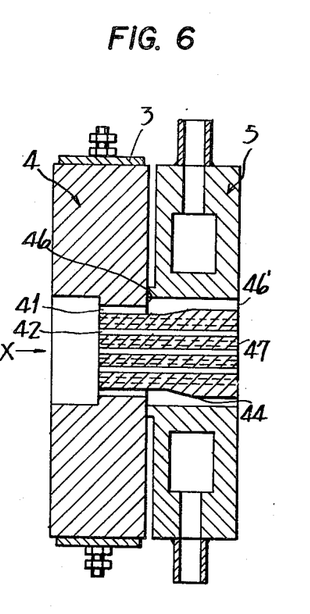
FIG. 6 is a sectional view of a forward portion of another embodiment of a die of the invention, in which a step-up is formed in a partly inclined relationship such that the outside dimension of the protruding portion formed by the step-up is progressively enlarged in the direction of extrusion.

The resin discharge plate in FIG. 6 has the features that (1) step-up 44 is outwardly enlarged between recessing portion 46 and protruding portion 47, and (2) the forward face of protruding portion 47 is protruded until it is positioned on about the same plane as the forward face of frame 5. Since step-up 44 is inclined, the aperture density in recessing portion 46 is determined on the basis of the area of the forward face 46'. That is, aperture density $p$ of apertures 41 in recessing portion 46 is obtained by dividing the sum of cross-sectional areas of apertures 41 in recessing portion 46 by the cross-sectional area of forward face 46'. On the other hand, aperture density $q$ of apertures 42 in protruding portion 47 is obtained by dividing the sum of the cross-sectional areas of apertures 42 by the area of protruding portion 47. Based on the aperture densities as mentioned above, the aperture density of apertures 41 in recessing portion 46 is greater than the aperture densities of apertures 42 in protruding portion 47.

Figure 7:
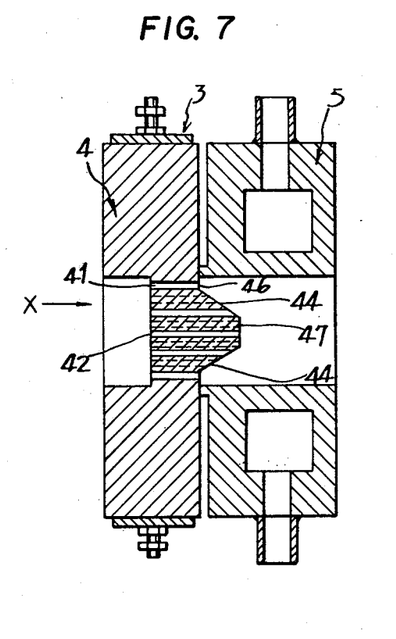
FIG. 7 is a sectional view of the forward portion of still another die embodiment, in which a step-up is formed in an inclined relationship such that the outside dimension of a protruding portion formed by the step-up is progressively reduced in the direction of extrusion.

The resin discharge plate in FIG. 7 is similar to the resin discharge plate in FIG. 1, but is different in that step-up 44 is inclined toward the axis of extrusion so as to form a protruding portion corresponding to the top surface of a truncated pyramid. Additionally, apertures are perforated in the inclined surface of step-up 44 causing step-up 44 to act as an independent protruding portion having its own aperture density. The aperture density in step-up 44 is obtained by dividing the sum of projected areas of the apertures on a plane perpendicular to the advancing direction of the resin by the projected area of the step-up 44 on said plane. The aperture density of apertures 41 in recessing portion 46 is greater than the aperture density of the apertures in step-up 44.

Figure 8A:
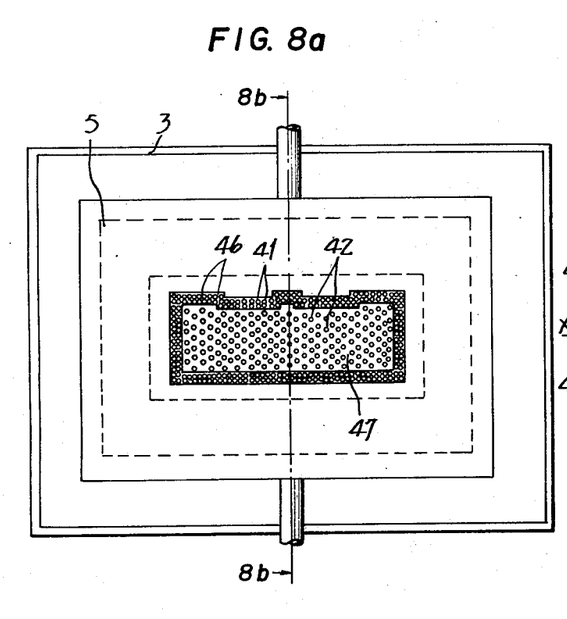
Figure 8B:
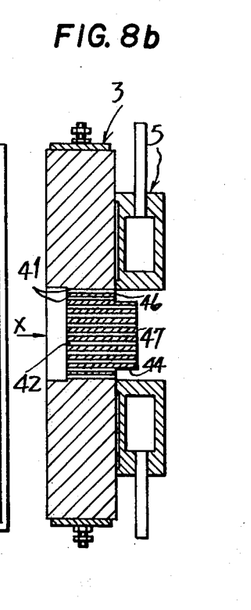

The die in FIG. 8 is basically identical to the die in FIG. 4, but is different in that the frame 5 and the step-up 44 are of particular shapes when viewed from the front of them, since it is intended to obtain an article having a cross-section of a lintel for sliding doors. In order to obtain the lintel for sliding doors, it is necessary to prepare a resin discharge plate provided with apertures distributed in a shape corresponding to a cross-section of the lintel, and to prepare frame 5 having an inner wall corresponding to the cross-section. Furthermore, it is required to form step-up 44 so as to produce a recessing peripheral portion 46 which is positioned along the periphery of the cross-section and has a fixed width. It is also required that the aperture density of apertures 41 in recessing portion 46 be greater than the aperture density of apertures 42 in protruding portion 47.

Figure 9A:
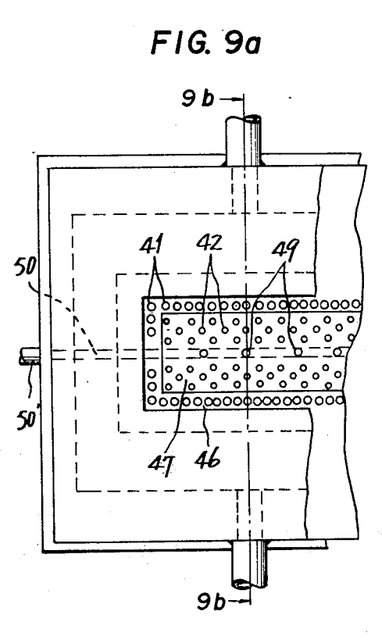
FIG. 9a is a front view of the forward portion of the die partly cut away.
Figure 9B:
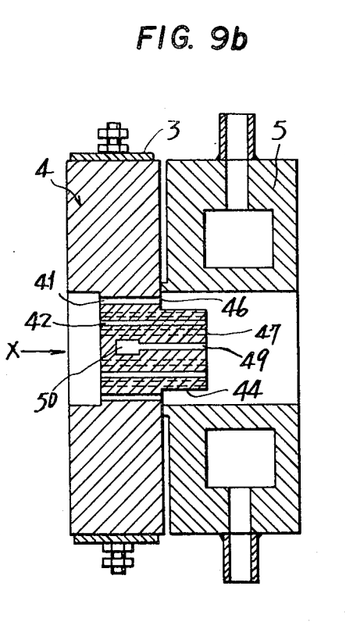

The resin discharge plate in FIG. 9 is similar to that in FIG. 1, but is different in that air vents 49 are opened on the forward face of protruding portion 47 at positions between apertures 42, and in that the vents 49 are connected with an air-passage 50, which is further connected to pipe 50' leading to the outside of the die. The end of pipe 50' may be opened to the air, or may be connected with a chamber under reduced pressure, in either case, pipe 50' acts so as to discharge gas from the face of protruding portion 47 through vents 49. Discharge of the gas through the pipe 50' prevents formation of gaps between resin members extruded from apertures 41 anf 42, when the resin members are coalesced to produce the unitary article.

In the process of the invention a die having the resin discharge plate described above is employed in combination with a cooling frame as shown in FIGS. 1 to 9. A foamable thermoplastic resin is advanced in a softened state in the direction indicated by arrow X to the figures and a plurality of resin members is extruded from the die. For the thermoplastic resin there may be used polystyrene, polyethylene, polypropylene, polyamide and the like. Of these, polystyrene and styrene copolymers are preferred. As the foaming agent there may be used a compound such as azodicarbonamide which decomposes and generates gas when heated, or compounds such as propane and butane which slightly dissolve or swell the resin and which has a boiling point lower tha the softening point of the resin. When the thermoplastic resin is a polymer or copolymer of styrene, it is preferable to use aliphatic hydrocarbons such as propane and butane together with fine powdery talc. Other suitable combinations of thermoplastic resin and foaming agents and the relative amounts of each that may be employed will vary depending on the desired characteristics of the foamed article and will be apparent to those skilled in the art.

When the foamable thermoplastic resin is extruded from the resin discharge plate of the die as shown in FIG. 1, the resin is extruded in larger amounts from apertures 41 than from apertures 42 per unit of cross-sectional area and as thicker members because apertures 41 have big diameters and small land lengths, whereas apertures 42 have small diameters and big land lengths. Furthermore, the thick members from apertures 41 are extruded into a space confined by step-up 44 and inner wall 51 of frame 5, thereby restricting the space in which the resin members can be foamed. The maximum foaming degree is dependent, therefore, upon the aperture density in the recessing, or peripheral, portion of the resin discharge face. Moreover, the thick members, immediately after being extruded from apertures 41, are contacted with inner wall 51 of frame 5 and cooled from the surface thereof. Thus, the resin members from apertures 41 are foamed to comparatively low foaming degrees.

On the other hand, the resin members extruded from apertures 42 are finer than the resin members extruded from apertures 41 and are foamed in a space corresponding approximately to protruding portion 47, wherein the aperture density of apertures 42 is similar than that of apertures 41. Thus, the resin members from apertures 42 are foamed to relatively high foaming degrees compared with the resin members from apertures 41. Thus resin members having low foaming degrees are formed in the outer portion and resin members having low foaming degrees are formed in the inner portion; the resin members in the outer portion beng first extruded, then the resin members in the inner portion being extruded, into the space which is enclosed by the resin members in the outer portion. Both resin members are passed together through frame 5 while the members are still being foamed and, therefore, all members are coalesced with each other to form a foamed article, in which the resin members in the surface portion are foamed to low foaming degrees relative to the inner resin members.

If the die provided with the resin discharge plate shown in FIG. 2 is employed, a foamed article is also obtained having resin members in the surface portion foamed to low foaming degrees. However, the resin discharge plate in FIG. 2 is different from that in FIG. 1 in that a face around apertures 41 is protruded on the resin inlet side of the plate, and as a result, apertures 41 are increased in their land lengths. A smaller amounts of resin, therefore, is extruded from each of apertures 41 as compared to that from apertures 41 in FIG. 1. Thus, through the use of the die in FIG. 2, a foamed article is obtained in which the resin members in the surface portion are more highly foamed than those obtained by the die in FIG. 1. Futhermore, since the resin discharge plate in FIG. 2 has two step-ups 44 and 45, there occur two variations in the foaming degree of the resin members extruded from the plate, which variations are caused by the recessing portion and the protruding portion. Thus, a foamed article can be obtained in which resin members have progressively greater foaming degrees proceeding from the surface of the center of the article. A foamed article having such gradual variations in the foaming degrees is superior to a foamed article having sudden variations in the foaming degrees because the resin members in the former are more intimately coalesced with each other than those in the latter and, additionally, because the surface layer in the former is not liable to separation from the inner part.

When use is made of the die provided with the resin discharge plate as shown in FIG. 3, there is also obtained a foamed article having resin members in the surface portion foamed to low foaming degrees. The die, however, in FIG. 3 is different from those in FIGS. 1 and 2 in that, firstly, the resin discharge plate in FIG. 3 has apertures 42 that are decreased in diameter in the vicinity of the resin inlet end. Thus, finer resin members are formed in apertures 42 and the foaming degrees can be increased in the resin members in the inner portion. Furthermore, protruding portion 47 is extended to the forward face of frame 5 and apertures 42 are increased in land lengths. Therefore, resin members extruded from apertures 42 are foamed outside of frame 5, and the resin members are coalesced with resin members extruded from apertures 41 after the resin members have left frame 5. Consequently, a foamed article can be obtained which is highly foamed and has dimensions somewhat larger than the inside dimensions of frame 5.

When use is made of the die provided with the resin discharge plate shown in FIG. 4, a foamed article can be obtained in which resin members in the surface portion are foamed to low foaming degrees. The die in FIG. 4, however, has advantages in comparison with the above-mentioned dies. Apertures 41 are perforated in two successive lines in the resin discharge plate; thus, resin members extruded therefrom are arranged in successive two lines and are foamed to low foaming degrees. It is possible, therefore, to obtain a foamed article having a thick layer foamed to a low foaming degree in the surface portion of the article.

When use is made of the die provided with the resin discharge plate as shown in FIG. 5, a foamed article can also be obtained in which resin members having low foaming degrees are formed in the surface of the article. However, the die in FIG. 5 can produce an article in which inner resin members are foamed to higher foaming degrees, and outer resin members are foamed to lower foaming degrees, than in the article prepared by means of the die in FIG. 3. Furthermore, with the use of the die in FIG. 5 it far easier to form an article having a desired cross-section, due to the presence of additional frame 5' mounted on frame 5. Thus, by means of the die in FIG. 5, it is possible to lower the average foaming degree of the foamed article.

When use is made of the die provided with the resin discharge plate as shown in FIG. 6, resin members having low foaming degrees can also be formed in the surface of the foamed article to be obtained. The die in FIG. 6, like the die in FIG. 3, can also produce an article having somewhat larger dimensions than the inside dimensions of frame 5. Furthermore, a portion of step-up 44 is inclined away from the extrusion axis and forms a tier having the shape of an inverted, truncated pyramid. Resin members extruded from apertures 41 are intimately coalesced with each other while being advanced from recessing portion 46 toward the forward face 46' and, consequently, form a foamed article which has a flatter and smoother surface.

When use is made of the die provided with the resin discharge plate shown in FIG. 7, resin members having low expansion degrees can also be obtained in the surface of the foamed article. However, the die in FIG. 7 produces an article having resin members of foaming degrees which become progressively and gradually greater with transition from the surface to the inner portions of the article similar to the article obtained by the die in FIG. 2. The die in FIG. 7, however, produces a foamed article in which the resin members in the surface portion are foamed to somewhat higher foaming degress than those of the foamed article obtained by the die in FIG. 2 because of inclined step-up 44.

When use is made of the die provided with the resin discharge plate shown in FIG. 8, resin members having low foaming degrees are also formed in the surface portion of the foamed article to be obtained. The die produces a foamed article in which resin members in the surface portion are foamed to low foaming degrees.

The members are arranged in two lines in the surface portion of the article and the article has a cross-section of a lintel for sliding doors. Thus, the foamed article has a hard surface, without further fabrication after extrusion, that sustains little damage or marring when rubbed. The article is advantageously used for a lintel for sliding doors.

When use is made of the die provided with the resin discharge plate shown in FIG. 9, resin members foamed to low foaming degrees are formed in the surface of the foamed article. The use of the die also prevents formation of gaps between contacting surface of resin members extruded from apertures 42 and coalesced with each other to form the foamed article, especially between resin members positioned in the inner portion of the article. Such an effect is conspicuous if it is desired to obtain a foamed article having a large thickness.

When preparing a foamed article having a broad width by means of any of the dies shown in FIGs. 1 to 9, it is preferable to interpose a temperature regulator between the die and the extruder, instead of attaching the die directly to the extruder. It is also preferable to provide a flow regulating plate to allow the resin to flow uniformly.

Figure 10:
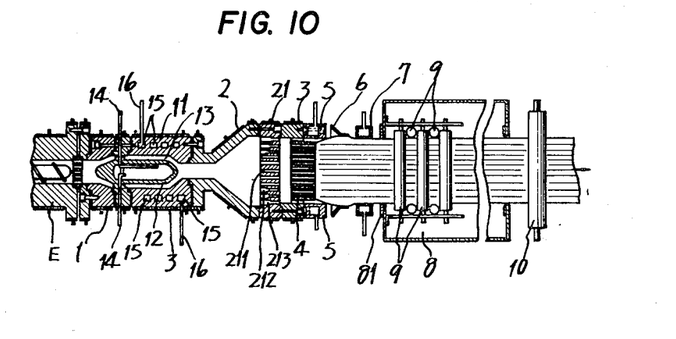
FIG. 10 is a partial sectional view of an embodiment of the invented process.

FIG. 10 shows an embodiment of the invention which includes these regulators. In FIG. 10, temperature regulator 1 is attached to the forward end of the extruder E, and die 2 is attached to the temperature regulator 1. Resin discharge plate 4 is mounted on the forward end of die 2, and flow regulating plate 21 is provided at a position on the resin inlet side of resin discharge plate 4 in die 2. Frame 5 is provided at the resin outlet side of resin discharge plate 4.

The construction of temperature regulator 1 is as follows. The temperature regulator 1 houses a torpedo 12, and an annular passage 13 defined by torpedo 12 and outer sheath 11. Torpedo 12 houses a cavity whereto pipes 14 extend. A heating or cooling medium is circulated through said pipes to heat or cool torpedo 12. Outer sheath 11 is provided with a winding passage 15 extending therethrough, both ends of which are connected to pipes 16. The heating or cooling medium is also circulated through the sheath passage via said pipes, therby heating or cooling outer sheath 11. Thus, the resin passing through passage 13 is heated or cooled by means of both outer sheath 11 and torpedo 12, and the resin temperature can be controlled within a narrow range.

Flow regulating plate 21 is provided with a number of perforations, and is positioned in the die in parallel relationship to resin discharge plate 4. In the example of the perforations shown in FIG. 10 perforation 211 having a diameter $d$ extend through the thickness of the plate in the center portion of the plate. Perforations 212 are positioned outside of (away from the axis of extrusion) of said perforations 211 and have a diameter $d$ at the resin outlet side but are enlarged at the resin inlet side and have a diameter $D$ which is greater than diameter $d$. Land lengths of portions of diamter $D$ of the perforations are progressively increased as the perforations approach the die wall. For example, perforations 213 have the longest land length for the portion having the diameter $D$. Molten resin can be more easily passed through perforations 212 than through perforations 211, and through perforations 213 more easily than through perforations 212. Without flow regulating plate 21 the resin will generally flow freely in the die near to the center line of the die but will flow slowly near the walls of the die. When use is made of flow regulating plate 21, however, the resin will flow uniformly, because the plate 21 impedes the passage of the resin through the center portion facilitates the passage of the resin through the outer portion.

After the resin has been passed through flow regulating plate 21 and has uniform flow in the width direction, it passes through resin discharge plate 4. In the outer and recessing portion of the plate 4, the resin is extruded from the apertures at an early stage into the space confined by the step-up and the frame. The foamable members are extruded in large amounts in comparison with the inner, protruding, portion, because of the greater aperture density, and are cooled from the outside due to contact with the cooling frame. The foamable members, therefore, are foamed to comparatively low foaming degrees. On the other hand, in the inner and protruding portion of the plate 4, the resin is extruded at a later stage from the apertures to form foamable members and the foamable members have a small volume and the foaming space is large because of the lower aperture density, in comparison with the outside and recessing portion. The foamable members, therefore, are foamed comparatively high foaming degrees. Thus, foamed members having different foaming degrees are coalesced into an assemblage, which is shaped to have a desired cross section by passing through forming mold 6.

The assemblage of the foamed resin members, after passing through forming mold 6, is passed through a cooling mold 7, wherein the members are coalesced more intimately and cooled from the surface. Since a cooling medium is circulated into the cooling mold 7, the assemblage of the foamed members is cooled and given a precise shape thereby. The assemblage of the coalesced members is then passed into a cooling bath 8, and is shaped further by plate 81. Cooling bath 8 contains therein a number of rolls arranged crosswise in parallel sets through which the assemblage of foamed members are passed thereby cooling the assemblage forming it into a final shape. The thus formed assemblage of foamed members is then taken up by take-up rolls 10.

According to the present invention, a foamed article is obtained in which the resin members in the surface portion are foamed to low foaming degrees and have high densities, while the resin members in the inner portion are foamed to high foaming degrees and have low densities. Thus, the foamed article contains a low foamed high density surface layer which is not susceptible to marring even though the article is porous. Since the foamed article is formed by coalescing a number of resin members, the foamed article has on its surface a number of lines formed by coalescing of the members. The lines are not deeply sunk, however, and the surface, therefore, is flat, smooth and beautiful. Furthermore, since the resin members are firmly coalesced with each other, the foamed article has a high strength. Therefore, according to the present invention a foamed article can be obtained which has a high surface hardness and a beautiful appearance.

Figure 11:
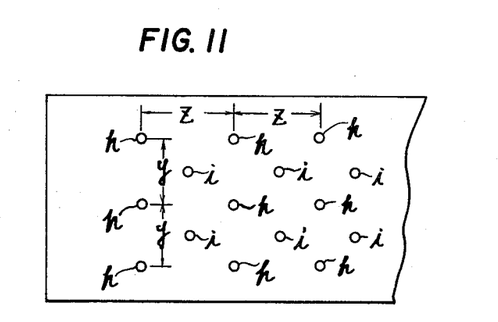
FIG. 11 is a schematic view of a portion of a resin discharge plate of a die, which shows an arrangement of apertures perforated in the resin discharge plate.

The invention is further explained by way of the following examples and comparative examples. In these examples, "part" means "part by weight." The foamed article obtained in each example was tested by the method described in Example 1 to determine the physical properties of the article. "Interval" referring to the distribution of apertures in the resin discharge plate of the die means the distance from the center of one aperture to the center of a contiguous aperture. The expression "apertures are provided in zigzag distribution at distances of Y mm in height and Z mm in width" means that, as shown in FIG. 11, apertures h are provided at distances Y mm in height and Z mm in width, and that additional apertures i having dimensions identical with those of apertures h are provided at the center of each of four adjacent apertures h.

EXAMPLE 1

To 100 parts of polystyrene were added 2 parts of fine powdery talc as nucleating agent and 0.1 part of brown pigment to form a mixture which was fed to an extruder, heated up to a temperature of 200° to 220° C. To this mixture there was added about 1.6 parts of butane.

The apparatus employed comprised, as shown in FIG. 10, a temperature regulator 1 mounted on the foward end of an extruder and die 2 provided with flow regulating plate 21. Oil was heated at 120° C and was circulated through temperature regulator 1 via pipes 17 and 13. As a result, die 2 was heated to a temperature of 150° C to 155° C.

Die 2 was provided with resin discharge plate 4, which had two step-ups 44 and 45, and to which was mounted frame 5, as shown in FIG. 2.

Resin discharge plate 4 had a rectangular portion, which was contacted with molten resin and which had a long side of 155 mm and a short side of 24 mm. Over the entire surface of said portion were perforated a number of apertures extending through the plate. The apertures on die 2 were surrounded by a frame 5 having inside dimensions of 22.5 × 154 mm and a length of 20 mm in the direction of extrusion of the resin. Apertures 41 are positioned in the peripheral, or recessing portion of the resin discharge plate and are arranged in one line at an interval of 2.5 mm, and have a diameter of 2 mm and a land length of 20 mm. Apertures 41 were 136 in total. The aperture density of the recessing portion was 34.3, which portion was defined by frame 5 and step-up 44. Step-up 44 was 5 mm in length and formed the first protruding portion, or face, 47. Apertures 42 were in two lines at an interval of 5 mm on the first protruding portion. Apertures 42 had a diameter of 1.4 mm, a land length of 15 mm, and totaled 60. The aperture density of the protruding portion 47 was 12.4. Step-up 45 had a length of 5 mm forming the second protruding portion 48. Apertures 43 were perforated in zigzag distribution at a distance of 5 mm in both directions and were arranged in a total of five lines. The apertures 43 had a diameter of 1.4 mm, a land length of 20 mm, and totaled 147. The aperture density of the second protruding portion was 15.3. Thus, the ratio of the aperture density of the recessing portion to the aperture density of the first protruding portion was 2.8 : 1.

Air at room temperature was circulated in frame 5 to cool the frame 5. Resin members extruded from resin discharge plate 4 were passed through forming mold 6 and cooling mold 7 while still in a softened state and then entered into cooling bath 8, passed through rolls 9. The so-produced foamed article was taken up by rolls 10. Take-up speed was 22 cm per minute. Thus, a foamed article was obtained which had a thickness of 20 mm and a width of 150 mm.

The foamed article had an average density of 0.33 g/cc. Coalescing lines between the resin members on the surface had the appearance of grains of wood. The coalescing lines were not deep however, and thus the surface was flat, smooth and beautiful. The article had a surface hardness of 60 to 70 when measured by means of a Type-D Durometer. The article had a bending strength of 190 kg/cm² in the longitudinal direction and 60 kg/cm² in the lateral direction.

The bending strength was measured by means of a Tensilon UTM-1 type made by Toyo Measuring Instrument Company Limited. Test pieces were cut to dimensions of 20 mm (thickness) × 50 mm (width) × 400 mm (length) when measuring the strength in the longitudinal direction, and to dimensions of 20 mm (thickness) × 50 mm (width) × 100 mm (length) when measuring the strength in the lateral direction. The tests were conducted at a bending rate of 30 mm/min.

EXAMPLE 2

In this example, a foamed article was prepared by means of an apparatus similar to that used in Example 1, except that there were used another extruder, a different resin discharge plate 4 and different frame 5. Plate 4 and frame 5 were those shown in FIG. 3.

To 100 parts of polystyrene particles containing 1.8% by weight of butane were added 2 parts of fine powdery talc and 0.1 part of brown pigment. The thus obtained mixture was fed to the extruder. The extruder was heated at a temperature of 200° to 220° C. The forward end of the extruder was cooled to 120° C, oil at 117° C was circulated in temperature regulator 1 to control the resin temperature, and die 2 was heated to 150° to 155° C.

Resin discharge plate 4 in the die had a rectangular portion, which is contacted with molten resin, having a long side of 155 mm and a short side of 24 mm. Over the entire surface of said plate were perforated a number of apertures extending through the thickness of the plate. The apertures in the peripheral recessing portion had a diameter of 2.0 mm and a land length of 10 mm. The apertures were arranged in one line at an interval of 2.5 mm, and were 136 in total. Frame 5 had inside dimensions of 22.5 × 154 mm and was 20 mm in length in the resin advancement direction. The inner surface of the frame was covered with a fluoro-resin. The aperture density in the recessing portion was 39.0. The step-up had a length of 20 mm, whereby protruding portion 47 was formed. Apertures 42 perforated in protruding portion 47 and had diameters of 2.0 mm at the resin inlet side. The diameter of each of the apertures 42 narrowed 20 mm from the inlet side of the plate. Each of apertures 42 had a reduced diameter portion 421 having a diameter of 1.4 mm and a land length of 10 mm. Apertures 42 were arranged on the protruding portion in seven lines in zigzag distribution at a distance of 4 mm in the direction of the short side and at a distance of 5 mm in the direction of the long side of the plate. Apertures 42 totaled 207. As a result, apertures were arranged in nine horizontal lines when apertures 41 and 42 were totaled. Aperture density of protruding portion 47 was 13.4. The ratio of the aperture density of the recessing portion to that of the protruding portion was 2.9 : 1.

Oil at 104° C was circulated to frame 5, which was cooled. Other procedures were conducted in the same manner as in Example 1, and a foamed article was obtained which had a thickness of 20 mm, a width of 150 mm, a density of 0.25 g/cc, and an appearance resembling grains of natural wood with a flat, smooth, beautiful surface.

When physical properties of the foamed article were measured in the same manner as in Example 1, it was found that the surface hardness was 65 – 70, the bending strength of the longitudinal direction 173 kg/cm², and the bending strength in the lateral direction 40 kg/cm².

EXAMPLE 3

In this example, a foamed article was prepared in the same manner as in Example 1, except that the resin discharge plate 4 and frame 5 of the apparatus were those shown in FIG. 4, and about 2 parts of butane were added to the resin.

Frame 5 had inside dimensions of 23 × 54 mm and was 30 mm in length in the advancing direction of the resin. The inner surface of frame 5 was covered with a fluoro-resin. Resin discharge plate 4 had a rectangular portion, which contacted the molten resin, having a long side of 155 mm and a short side of 24 mm. Over the entire surface of said portion were perforated a number of apertures extending through the thickness of the plate. Among the apertures, aperatures 41 were arranged in two lines on the peripheral recessing portion at an interval of 2.0 mm along the long side and the short side, and had a diameter of 1.6 mm and a land length of 10 mm. Apertures 41 were 336 in total. The aperture density of the recessing portion was 44.9. Step-up 44 had a length of 10 mm in the advancing direction thereby forming protruding portion 47. Apertures 42 were perforated in the protruding portion 47 and have diameters of 1.6 mm, land lengths of 20 mm. Apertures 42 are arranged in seven lines in zigzag distribution at a distance of 4 mm in both long side and short side directions. The apertures were 256 in number. The aperture density of apertures 42 in protruding portion 47 was 25.0. Apertures 41 and 42 together were perforated in eleven lines. The ratio of the aperture density in the recessing portion to the aperture density in the protruding portion was 1.8 : 1.

Oil at 120° C was circulated in frame 5; other procedures were conducted in the same manner as in Example 1. A foamed article was obtained at a take-up speed of 29 cm/min and had a thickness of 20 mm, a width of 150 mm, and a density of 0.22 g/cc.

The foamed article had a flat, smooth surface; the resin members of which were of small width in comparison to those of the article obtained in Example 1. When physical properties of the article were measured in the same manner as in Example 1, it was found that the surface hardness was 50 – 60, the bending strength in the longitudinal direction 135 to 145 kg/cm², the bending strength in the lateral direction 30 to 35 kg/cm². Thus both bending strengths were proved to be high.

EXAMPLE 4

This example was conducted in the same manner as in Example 2, except that there were used the resin discharge plate 4 and frame 5 shown in FIG. 5, and the polystyrene particles used contained about 2% by weight of n-pentane instead of butane.

In this example, resin discharge plate 4 was the same as that in Example 2, and two frames, i.e., a first frame 5 and a second frame 5', attached to each other in series were used. The first frame 5 had inner dimensions of 23 × 154 mm and was 20 mm in length; the second frame 5' had inner dimensions of 23 × 154 mm and was 30 mm in length. Inner walls of each frame were covered with a fluoro-resin.

Air at room temperature was circulated to frames 5 and 5'. A foamed article was taken up at a speed of 22 cm/min. The article had a thickness of 18 mm, a width of 50 mm, and a density of 0.33 g/cc. The article had a flat, smooth surface and a beautiful appearance. The article had a surface hardness of 70– 80, a bending strength in the longitudinal direction of 218 kg/cm², a bending strength in the lateral direction of 65 kg/cm². Thus the article proved to have high strengths.

EXAMPLE 5

This example was conducted in the same manner as in Example 1, except that there were used resin discharge plate and frame 5 shown in FIG. 9, plate 4 being provided with gas-discharging vents 49. Thus, it was intended to obtain a foamed article which had no substantial gaps between resin members contained therein.

Resin discharge plate 4 was a rectangular plate having a long side of 155 mm and a short side of 24 mm. A number of apertures were perforated on the entire surface of the plate. Apertures 41 were perforated in a line at an interval of 2.5 mm in the width direction on the recessing portion and totaled 146 in number. The aperture density in the recessing portion was 51.9. The step-up was 10 mm in length, by which interior protruding portion 47 was formed. Apertures 42 were perforated in protruding portion 47 with a zigzag distribution at a distance of 4 mm in the short side direction and of 5 mm in the long side direction, said apertures 42 each having a diameter of 1.6 mm and a land length of 23 mm and being arranged in six lines. Apertures 42 were 162 in number. As a result, the aperture density in the protruding portion 47 was 12.3. Apertures in the recessing and protruding portions formed eight lines. The ratio of the aperture density in the recessing portion to that in the protruding portion was 4.2 : 1.

Gas-discharging vents 49 were provided on resin discharge plate 4 at an interval of 15 mm on a line connecting the midpoints of both short sides thereof, and were 15 in total. The vents 49 had a diameter of 2.5 mm. The ends of vents 49 were connected with air passage 50, which was further connected with pipe 50'. Thus air on the face of protruding portion 47 was discharge through pipe 50'.

Frame 5 had inner dimensions of 23 × 154 mm and was 30 mm in length and had inner surfaces covered with a fluoro-resin.

Oil at 120° C was circulated to frame 5 and foamable resin members were extruded from the resin discharge plate and were taken up at a speed of 29 cm/min, thus forming a foamed article having a thickness of 20 mm, a width of 150 mm, and a density of 0.22 g/cc.

The obtained article had a hard surface, the hardness of which was 60 – 65, and had a high bending strength, such that the bending strength was 148 kg/cm² in the longitudinal direction, and 29 kg/cm² in the lateral direction. The article had a flat, smooth and beautiful surface with no substantial gaps between the resin members in the inner portion thereof.

Another foamed article was obtained in the same manner as above, except that each of forming mold 6, cooling mold 7, forming plate 81 and rolls 9 was enlarged only in the thickness direction of the foamed article to provide a slightly larger inner dimension in the thickness direction. The foamed article had a thickness of 16 mm, a width of 150 mm, and a density of 0.25 g/cm³. In the same manner another foamed article was obtained by further increasing the inner dimensions of each of forming mold 6, cooling mold 7, forming plate 81 and rolls 9. The foamed article had a thickness of 25 mm, a width of 150 mm, and a density of 0.2 g/cm³. All of obtained articles had a hard, flat, smooth and beautiful surface and high bending strengths.

It is a great advantages of the process of this invention that the thickness of foamed articles obtained thereby can be desirably controlled employing the same resin discharge plate 4 and frame 5, simply by changing the inner dimensions of the forming mold 6 and the like.

EXAMPLE 6

Polypropylene was used as the resin in this example.

To 100 parts of polypropylene was added 1.5 parts of fine powdery talc, 0.1 part of azodicarbonamide and 0.2 part of brown pigment to form a mixture, which was fed to an extruder. The extruder was heated to 240° C, in the course of which about 3.5 parts of butane was added to the mixture.

Temperature regulator 1 was used with oil at 140° C being circulated through pipes 14 and 16 to regulate the resin temperature. Die 2 was heated to 155° – 160° C.

Resin discharge plate 4 and frame 5 similar to those shown in FIG. 2 were used except that the plate 4 was provided with apertures 42 on the first protruding portion 47 and with apertures 43 on the second protruding portion 48 each having a diameter of 1.6 mm. Thus, the aperture density in recessing portion 46 was not varied but the aperture density in the first protruding portion was varied to 16.4, and that in the second protruding portion to 19.9. Subsequently, the ratio of the aperture density in recessing portion 46 to the aperture density in the first protruding portion 47 was 2.1 : 1.

Air at room temperature was circulated in frame 5, and the resin was extruded and taken up at a rate of 24 cm/min. Thus a foamed article was obtained which has a thickness of 20 mm, a width of 150 mm and a density of 21 g/cm³.

The foamed article had a hard, flat, smooth and beautiful surface. Tests were made to determine physical properties of the article according to the testing methods described in Example 1, and it was determined that the article had a surface hardness of 30 – 40, a bending strength in the longitudinal direction of 58 – 73 kg/cm³, and a bending strength in the lateral direction of 35 – 45 kg/cm³.

EXAMPLE 7

This example was conducted in the same manner as shown in FIG. 10, except that the resin discharge plate 4 and the frame 5 shown in FIG. 8 were employed. Temperature regulator 1 was omitted.

To 100 parts of polystyrene containing about 0.8% by weight of butane were added 2 parts of fine powdery talc and 0.1 part of brown pigment to form a mixture, which was fed to an extruder. The extruder was heated to 160° C, the forward end of the extruder was cooled to 125° C, and die 2 was maintained at 150° to 155° C.

Resin discharge plate 4 had a long side of 110 mm, and a short side of 40 mm. A number of apertures were perforated over the entire surface of the plate so as to be distributed in the shape of a cross-section of a lintel for sliding doors. In particular, apertures 41 were perforated in two lines at an interval of 2.5 mm in the outer recessing portion 46, each of the apertures having a diameter of 2 mm, a land length of 10 mm. The apertures totaled 218. Thus, the aperture density in the recessing portion 46 was 60.8. Step-up 44 had a length of 5 mm and formed protruding portion 47. Apertures 42 were perforated in the protruding portion 47 in a zigzag distribution of 5 mm distance in the short side direction and of 4 mm distance in the long side direction, each of the apertures having a diameter of 1.6 mm, and a land length of 15 mm. There were a total of 179 apertures 42. Thus, the aperture density in the protruding portion was 12.9. Consequently, the ratio of the aperture density in recessing portion 46 to that in protruding portion 47 was 4.7 : 1.

Frame 5 had inner dimensions corresponding to the cross section of said lintel and a length of 20 mm; the inner surface of the frame being covered with a fluororesin. Air at room temperature was circulated in frame 5 to cool it, and a foamed article was taken up at a speed of 36 cm/min. Thus a foamed a article was obtained which has a density of about 0.5 g/cm³, and the shape of a lintel. The foamed article had a flat, smooth, beautiful surface and a high surface hardness of 60 – 70. The surface was hard to mar, and was suitable for use as a lintel for sliding doors.

COMPARATIVE EXAMPLE 1

This comparative example was conducted in the same manner as in Example 1, except that a conventional die 2 was used which had a resin discharge plate with no step-up on the resin discharge face thereof, and frame 5 was not used. The process corresponds to the process in U.S. Pat. No. 3,720,572.

In particular, the die in this Comparative Example was the same as that of Example 1 in that it had a resin discharge plate of a rectangular shape having a long side of 155 mm, a short side of 24 mm, and a thickness of 20 mm. Apertures having a uniform diameter of 1.6 mm were perforated in nine lines and at an interval of 2.5 mm in both the long side direction and the short side direction. The apertures were 549 in number. Since the plate had no step-up on the resin discharge face, there was a single density of 34.5.

By means of above die, a foamed article was obtained which had a thickness of 20 mm and a width of 150 mm. The article was not flat, smooth and beautiful on the surface, and was inferior to that of Example 1 both in surface hardness and bending strength. In particular, the article had a density of 0.03 g/cm³, which is the same as that Example 1, but had a surface hardness of 25 – 35, a bending strength in the longitudinal direction of 130 – 140 kg/cm², and a bending strength in the lateral direction of 17 – 28 kg/cm², which were inferior to those of Example 1.

COMPARATIVE EXAMPLE 2

This comparative example was conducted in the same manner as in Comparative Example 1, except that frame 5 was mounted on the die of Comparative Example 1, and that air at room temperature was circulated in the frame 5 to cool it. That is, Comparative Example 2 differed from Example 1 only in that no step-up was formed on the resin discharge face of the plate 4, and accordingly, no variation was made in the aperture density in portions of plate 4. Cooling was carried out in the same way as in Example 1.

The foamed article thus obtained was found to be somewhat higher both in surface hardness and in bending strength, but was not found to possess a flat, smooth, and beautiful surface. In particular, the foamed article had a density of 0.33 g/cm³, which was the same in that in Example 1, but had a bending strength of 160 – 170 kg/cm² in the longitudinal direction and a bending strength of 20 – 30 kg/cm² in the lateral direction, which were inferior to those of Example 1.

Although the invention has been described in conjunction with certain specific embodiments thereof, it is to be understood that the invention is not limited to these embodiments, but is intended to include all the embodiments within the scope and spirit of the appended claims.

What is claimed is:

1. In a process for preparing a foamed article of thermoplastic resin having a straight wood grain pattern on the surface thereof wherein a melt of foamable thermoplastic resin is extruded through a die having a resin discharge plate with plural rows of plural apertures to form, upon extrusion, a plurality of resin members which are thereafter passed through a cooling zone and coalesced to form the foamed article, the improvement comprising: extruding said foamable thermoplastic resin through a resin discharge plate having an apertured peripheral resin discharge portion and an apertured interior resin discharge portion such that said interior discharge portion extends beyond said peripheral discharge portion in the direction of extrusion to form first extruded peripheral resin members and second extruded inner resin members, aperture density in said peripheral resin discharge portion being 1.5 to 5 times greater than aperture density in said interior resins discharge portion; and immediately passing the extruded peripheral resin members from said apertured peripheral resin discharge portion through a cooling frame extending longitudinally in the direction of extrusion, said frame being positioned in peripheral contact with said peripheral discharge portion in such a manner as to restrict lateral expansion of said peripheral resin members, said cooling frame forming an extension of the die, causing said peripheral extruded members to exit from the peripheral resin discharge portion into restrictive contact with the cooling frame and to pass through at least a portion of the cooling frame and thereafter coalescing the still softened peripheral resin members with the inner resin members being discharged through said apertured inner resin discharge portion.

2. The process of claim 1 wherein the interior resin discharge portion comprises at least two tiers.

3. The process of claim 1 wherein the interior resin discharge portion has sidewalls inclined away from the axis of extrusion thereby forming a tier having a cross-section perpendicular to the axis of extrusion that becomes progressively greater in the direction of extrusion.

4. The process of claim 1 wherein the forward face of the cooling frame extends beyond the interior resin discharge portion of the resin discharge plate.

5. The process of claim 1 wherein the apertures in the interior resin discharge portion of the resin discharge plate extend 5 to 50 mm beyond the apertures in the peripheral resin discharge portion of the resin discharge plate in the direction of extrusion.

6. The process of claim 1 wherein apertures of the interior resin discharge portion of the resin discharge plate are positioned so as to conform to the upper surface of a truncated pyramid, said pyramid being formed by said interior discharge portion of said plate.

7. The process of claim 1 wherein thickness of the apertured peripheral discharge portion of said resin discharge plate is less than thickness of said apertured interior resin discharge portion of said plate.

8. In a process for preparing a foamed article of thermoplastic resin having a straight wood grain pattern on the surface thereof wherein a foamable thermoplastic resin is extruded through a die having a resin discharge plate which is provided with a plurality of apertures to form, upon extrusion, a plurality of resin members which are thereafter passed through a cooling zone and coalesced to form the foamed article, the improvement comprising: extruding a first portion of said melt through the resin discharge plate, said resin discharge plate having an apertured peripheral resin discharge portion and an apertured interior resin discharge portion such that the said interior discharge portion extends beyond said peripheral discharge portion in the direction of extrusion, forming plural outer extruded resin members; cooling and coalescing the outer resin members by immediately passing the outer resin members into restrictive contact with the inner walls of a cooling frame and with sidewalls of the interior resin discharge portion of the resin discharge plate, said cooling frame being an extension of the die and being in peripheral contact with the peripheral discharge portion of the resin discharge plate; thereafter, extruding a second portion of said melt through the interior resin discharge portion of the resin discharge plate to form inner extruded resin members which expand and coalesce with the outer extruded resin members and with each other and form the desired foamed article, aperture density in the peripheral resin discharge portion of the resin discharge plate being 1.5 to 5 times the aperture density in the interior resin discharge portion of the resin discharge plate and the extruded resin members being in a softened state as they are passed through the cooling frame.

* * * * *

UNITED STATES PATENT OFFICE
CERTIFICATE OF CORRECTION

Patent No. 3,993,721  Dated November 23, 1976

Inventor(s) SHIGENARI SODA ET AL

It is certified that error appears in the above-identified patent and that said Letters Patent are hereby corrected as shown below:

In Abstract of Disclosure line 6: delete "fiered" and insert therefor --tiered-- at the end of the line.

Column 2, line 25: delete "a";

line 34: delete "inventions" and insert therefor --inventors--.

Column 3, line 11: delete "THe" and insert therefor --The-- at the beginning of the line.

Column 8, line 32: delete "anf" before "42" and insert --and--.

Column 15, line 22: delete "aperatures" before "41" and insert therefor --apertures--.

Signed and Sealed this

Twenty-sixth Day of April 1977

[SEAL]

Attest:

RUTH C. MASON  
*Attesting Officer*

C. MARSHALL DANN  
*Commissioner of Patents and Trademarks*